Figure 1:
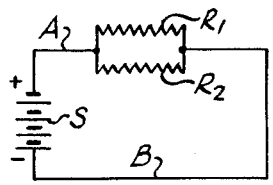

May 29, 1962  R. B. CUMMINGS  3,037,161
METHOD AND APPARATUS FOR LOCATING FAULTS IN TRANSMISSION LINES
Filed Sept. 22, 1958

INVENTOR.
RODNEY B. CUMMINGS
BY
Gustave Miller
ATTORNEY

United States Patent Office 3,037,161
Patented May 29, 1962

3,037,161
METHOD AND APPARATUS FOR LOCATING FAULTS IN TRANSMISSION LINES
Rodney B. Cummings, Philomath, Oreg.
Filed Sept. 22, 1958, Ser. No. 762,387
2 Claims. (Cl. 324—52)

This invention relates to the testing of electrical circuitry generally but more particularly to a novel application of conventional electrical current and/or voltage detection and measurement devices which are employed to determine where a fault exists in, on, or relative to an electrical circuit and which is particularly adapted for locating faults in long transmission lines. This is a continuation-in-part of my pending application S.N. 594,163 filed June 27, 1956, and now abandoned.

Numerous testing and fault locating devices and methods are well known by which different measurements are made and compared. In general, these devices are such as the Wheatstone or Kelvin bridges, or relative modifications such as the Murray or Varley loops. Fault locators of this type, while accurate, invariably entail calculations of a higher order to localize or pin point a fault and when adapted to directly furnish the desired result they are complicated and too expensive for the ordinary electrical trouble shooting serviceman.

Other conventional types of test instruments more commonly used are the various types of split loops which snap around a current carrying conductor for direct reading of current load and the simple volt, ohm, milliammeter used by most radio servicemen, however the aforementioned types all have certain limitations and time and labor consuming factors.

A simple, inexpensive, fault locating method which is highly accurate and which furnishes a result which immediately can be translated by direct reading, into the exact nature and location of the fault without calculations or other intermediate steps requiring the skill of highly trained personnel, has long been desired by the electrical industry and especially so where trouble shooting a single conductor is involved.

A primary object of this invention is to provide an improved method for testing faulty electrical circuitry rapidly and efficiently to determine where the fault is located.

A particular object of this invention is to provide a novel method of quickly and easily analyzing a single electrical conductor for defects, and if a defect is present, to rapidly locate the exact point of the defect.

A broad object of this invention is to provide a simple method of determining the location of an abnormal condition upon a single electrical conductor, by connecting one or more electrical current flow indicators in parallel with the said single electrical conductor, said current flow indicator being directly informative of the direction of the faulty electrical condition of the single conductor.

A principal object of this invention is to provide a durable, portable, compact and light weight current flow indicating device which is easily and rapidly attached according to this invention to any single exposed electrical conductor, whether the exposed conductor has an insulated covering or is bare, the attachment of the test device according to this invention being made without cutting, dismantling or otherwise disturbing the installed conductor, resulting in maximum overall wherever this invention is applicable.

This invention further relates to a simple and efficient means for locating faults and particularly to fault locating instruments for localizing faults in conductors, and on lines such as telephone, power, telegraph, etc., running over long distances. The instrument of the type herein disclosed determines the exact nature and innate location of the fault with a minimum amount of time and effort.

The equipment of this invention allows a readily simple testing operation using a ground or grounds on one wire or a paralleling connection of two wires as will be apparent from the specification. The testing can be done by one man without the necessity of much skill and with no calculations or knowledge of mathematics. Further, very little electrical energy is required to operate the equipment. Even if there be several cases of trouble on a line it will be possible to go to one case at a time and locate the worst one first, if desired. One important feature is that no matter how many failures are in or on the line, no line cutting or line opening is necessary and the trouble spot can be quickly located.

Essentially the equipment comprises a tester connected in parallel with a conductor through which current is directed from the conductor and back to the conductor through or relative to the trouble spot in or on the conductor, such as short-circuit, cross-connection, ground, etc., and following that current with the current detector device of the tester.

The principal object of the invention is to provide fault finding methods and fault finding equipment using the methods which allow simple construction, high accuracy and reliability, with a minimum amount of skill.

A further object is to provide a simple tapper device mounted on a long pole to enable the operator to hang the tapper device over the line having the fault at successive stations along the line, said device having a pair of spaced spring pressed contacts with means for piercing through any insulation on said line without harming the conductor therein.

A further object is to connect a sensitive direct current indicating meter between said contacts for detecting any direct current flow in the line.

A further object is to carry a portable source of direct current with the above meter for supply of current through one of said contacts to the line, where the line has no direct current flowing through it to the fault.

Other objects and advantages exist in the detailed description of the invention which will become more apparent from the following description and drawings.

Reference is now had to be accompanying drawing which forms a part thereof.

Figure 2:
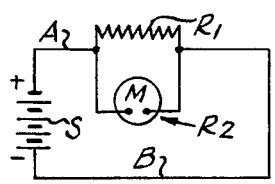
Figure 3:
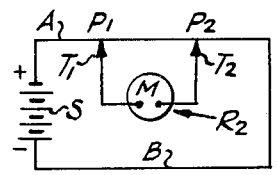
Figure 9:
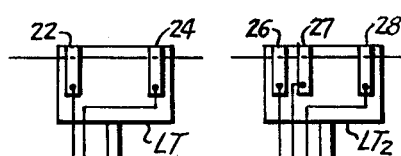
Figure 10:
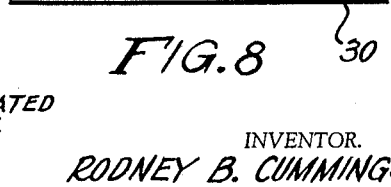

In the drawing:
FIGURE 1 is a showing of the principle of the equipment in a resistance type circuit.
FIGURE 2 is a showing along the line of FIG. 1, except an electric measuring meter is in the circuit.
FIGURE 3 is a modified version of FIG. 2.
FIGURES 4 through 7 illustrate various circuits for testing the conductors on lines such as telephone, telegraph, power, etc.
FIGURE 8 is a schematic view of a tester equipment or unit.
FIGURE 9 illustrates a line tapper device placed on a line.
FIGURE 10 illustrates a modified form of line tapper device.

This invention relates to a novel way for parallel detection and directional location of electrical circuit trouble such as shorts, crosses, grounds, etc. on lines such as telephone, power, telegraph, etc.; by the use of a current detecting device connected in parallel with one conductor of the circuit in trouble.

This invention includes a current detecting device connected in parallel with a conductor and battery fed through the conductor in such a way that the current will return to the battery through or relative to the trouble on the circuit, such as, shorts, crosses, grounds, etc., and the following that current with the current detecting device to the trouble is a novel use of a suitable current flow detecting device and an expeditious way of localizing troubles in electrical circuitry.

In FIG. 1 there is shown as preamble to the inventive principle how resistor R1 is connected in parallel with resistor R2; so that when electrical power supply S is connected to this circuit by wires A and B the current and voltage will divide through resistors R1 and R2 and the resistance in ohms or fractions thereof of each resistor and the value of the total current and E.M.F. in the circuit will determine what the value of the current will be through each resistor as determined by Ohm's law. It is known by Ohm's law that changing the resistance of the circuit changes the value of the current flowing in the circuit. Changing the voltage will also change the value of the current flowing in the circuit or any sub-divided part of the same circuit. One may, by changing the ratio of resistance of each of the two resistors in parallel, change the proportion of the current flow through each resistor.

In FIG. 2 there is shown the inventive operating principle herein by employing an electrical current detecting meter M which has here been inserted in place of resistance R2; thus, the proportion of current in R2 is still governed by the ohmic resistance of each resistor which in R2, in this case, is the internal electrical resistance of the meter. If the internal electrical resistance of the meter is lowered and the resistance of resistor R1 is increased an increase results in the proportion of the current flowing in resistor R2, which is the meter. By increasing the resistance of R2 and decreasing the resistance of R1 a decrease is shown in the proportion of the current flowing through the meter (resistance R2).

In FIG. 3 there is shown a solid conductor A to which a meter M has been test clip connected in parallel. The resistance of R1, in this case, would be the resistance of the conductor A between test clip points P1 and P2. The resistance R2 would be as in FIG. 2 the resistance of the meter, plus the resistance of the test cords and clips which are used to connect the meter M to conductor A. The value of current flowing from S through the meter, which will be the current which operates the meter indicator is again governed (as determined by Ohm's law) by the ratio of the resistance of R1 and the meter (R2). By changing resistance R1 by moving the test clips R1 and T2 further apart on conductor A and doubling this distance the resistance of R1 will be doubled. Also putting in a meter of lower internal resistance increases sensitivity. Either by raising the resistance of R1 or lowering the resistance of the meter (R2) will increase the amount of current flowing through the meter. An increase in voltage of the power supply with the resistance of R1 and R2 remaining the same will also increase the value of the current flowing through resistance R1 and a corresponding increase in R2.

Figure 4:
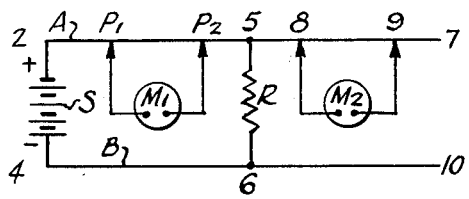

In FIG. 4 there is shown a battery S which has been connected between conductors A and B at points 2 and 4. At point 5 on conductor A a resistor R is connected from conductor A to conductor B at point 6. Now a current is flowing through the circuit from battery S through conductor A to point 5 and through resistor R to point 6 and back through conductor B to the battery. A current is not flowing in conductor A from point 5 to 7. Nor is a current flowing in conductor B from point 6 to point 10. By connecting a direct current indicating meter M in parallel with conductor A at points P1 and P2, a proportion of the current is flowing through the meter, which would indicate the presence of the current by a deflection of the meter's indicator. Now connecting meter M2 in parallel with conductor A at points 8 and 9 will not give a deflection of the meter's indicator because there is no current flow between points 5 and 7 on conductor A. By placing the meter anywhere along the conductor A between points 2 and 5 on conductor A and between 6 and 4 on conductor B gives a deflection of the meter's needle, showing current flow between the battery and resistance R. It is readily seen that by moving our meter test clips T along conductor A toward point 7 or along conductor B toward point 6 will produce a deflection of the meter's needle until passing resistance R. Passing resistance R will no longer give a deflection of the meter's pointer relative to the meter's scale. This now locates the points on conductors A and B where resistor R is concerned.

Figure 5:
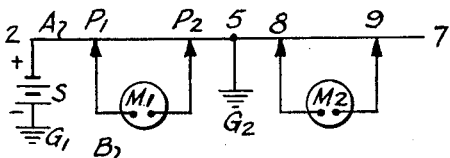

In FIG. 5 there is shown where conductor A has been grounded at point 5 and battery S has been connected from point 2 to conductor A and ground G. Now a current is flowing from the battery through conductor A through point 5 to ground and back through ground to the battery. A current is not flowing in conductor A from point 5 to point 7. By again connecting meter M1 to points P1 and P2 in parallel with conductor A, a deflection of the needle on meter M1 is obtained, indicating a current flowing. By connecting meter M2 to points 8 and 9 in parallel with conductor A, a deflection is not obtained on meter M2, indicating no current on conductor A from points 5 to 7. By moving the meter M1 anywhere along conductor A between points 2 and 5, will give a deflection of the meter's needle, but passing the ground at point 5 on conductor A does not give a deflection of the needle anywhere between point 5 and point 7 on conductor A; thus, by moving the meter along conductor A, starting near point 2 and moving in the direction of point 7 until no longer getting a reading, locates point 5 where the ground has been placed on conductor A.

Figure 6:
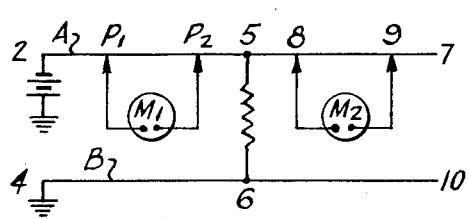

In FIG. 6 there is shown a battery S connected to ground at point 2 on conductor A and placing resistor R across conductors A and B at points 5 and 6 and grounding conductor B at point 4, now having a flow of current from battery S through conductor B to ground and back to battery S, and not having a current flow on conductor A from points 5 and 7 or on conductor B from points 6 to 10. Again, connecting meter M1 in parallel with conductor A at points P1 and P2 a deflection is shown on the meter indicating a current flow. Connecting meter M2 in parallel with conductor A at points 8 and 9 does not give a deflection of the meter's needle indicating there is no current flowing between 5 and 7. By moving the meter from points P1 and P2 on conductor A along the conductor to point 5, gives a deflection of the meter's needle until passing resistance R at point 5. After passing point 5 on conductor A there will no longer be a deflection of the needle, indicating having passed resistance R.

Figure 7:
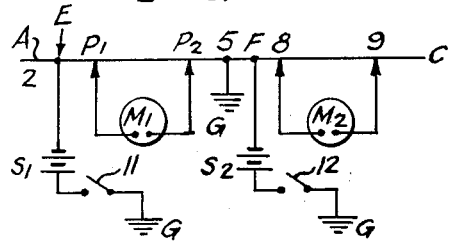
Figure 8:
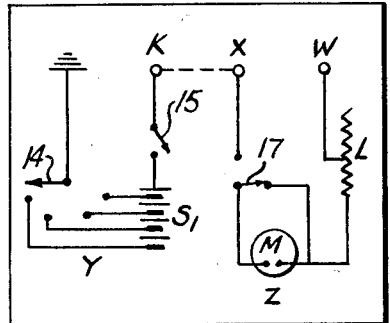

As shown in FIG. 7, conductor A has been grounded at point 5. Now connecting meter M1 in parallel with conductor A at points P1 and P2 there will not be a reading on meter M1 because of no current flow. A battery S1 is connected to conductor A at point E and through switch 11 to ground G. The meter M1 has been placed between the battery S1 and the ground at points P1 and P2 on conductor A. Closing switch 11 will cause a current flow from battery S1 through conductor A and meter M1 to ground at point 5 and back through ground to battery S1, the needle on meter M1 now deflects, indicating a current flow. Now connecting M2 in parallel with conductor A at points 8 and 9 and connecting battery S2 to conductor A at point F and to ground G through switch 12 and closing switch 12, will cause a current flow from the battery S2 through conductor A from point F to point 5 to ground and back through ground to the battery S2. The needle on meter M2 does not deflect, indicating that there is no current in conductor A between points F and C. By moving meter M1 and battery S1 along conductor A to point 5 and closing switch 11, a current flow is shown on the meter M1. When M1 has passed point 5 there will no longer be a current flow shown, thus locating the ground at point 5. It is necessary, in this case, to place the battery S1 at the same point in reference to our meter M1 at all times; thus, the battery S1 should always be placed between point 2 on conductor A and the meter M1 when moving along conductor A to locate the ground at point 5.

Circuit modifications Y and Z are shown in FIG. 8. In modification Y battery S1 is connected to ground G through switch 14. Any one of several different voltages may be obtained from this circuit by throwing the selector of switch 14 to any one of the several tapped positions of switch 14, each tap being connected to one of a tapped group of batteries connected in series. Test clip K is connected at any point where variable test voltages are needed, as e.g. to terminal X when it is normally connected to one of the conductors 32 or 34 of a tapper such as LT. The other terminal W is then connected to the other of these tapper conductors.

A normally off press-button switch 15 may be used for energizing the line and test meter after the other switches have been properly set for detecting the shunt current through the meter. In modification Z, switch 17 is closed as shown, which places a direct shunt across meter M for overload protection. Potentiometer L is employed to vary the amount of current through meter M as desired, by varying the resistance of same which further protects meter M from too much current.

There is shown in FIG. 9 a line tapper LT with two spring-type pressure connections 22 and 24 with a conductor from each connection reaching to the ground, the tapper to be placed along the wires to be tested making parallel connections with open serial wires such as used for the telephone, telegraph and electrical industries. This line tapper is used to connect the test meter in parallel with the line under test. This type line tapper is used to easily disconnect or connect the test meter to elevated serial lines and in locating trouble on the line when using this invention as a portable unit.

There is also shown in FIG. 10 another type line tapper LT2 with three spring-type pressure connections 26, 27, and 28 for use in parallel tapping of open serial wires, with three conductors reaching to the test equipment on the ground, each conductor is connected to one of the spring-type pressure connections 26, 27, and 29 of line tapper LT2.

In every case, it should be understood that the type of meter used will depend upon the type of trouble that the equipment would have to locate. If it is necessary for the equipment to locate very high resistance trouble, it would be necessary to have a meter that would measure very low amounts of current, therefore requiring a very sensitive meter, such as vacuum tube amplified types of current detecting meters. However, if the equipment does not need to locate extremely high resistance troubles, meters such as standard microammeters of very low internal resistance, galvanometers of low internal resistance or milliammeters that will respond to very low currents, etc. can be used as the test indicator.

If a current of direct type is being supplied to the line at the time of the test, no portable supply of current is needed in the test outfit. However, if the line is dead or even if an alternating current or signal is being supplied at the time, a source of direct current in the portable test outfit will be connected to connection 26 of the tapper LT2 for superimposing on the direct current, and a direct current meter would obviously be used in the test equipment to detect the flow through the shunt between the tapper connections 27 and 28, without interfering with or being affected by the alternating signal, if any, being transmitted by the line.

The tapper LT may be used when a current of some type is being supplied to the line, and an appropriate meter is used for detecting the flow of such current through the shunt between the tapper connections 22 and 24.

To provide different ranges of current supply and different ranges of sensitivity of the meter which may be required in any type of service, the portable test equipment may include a plurality of batteries S1 connected in series and having a control switch 14 for cutting in as many of the batteries as may be needed in the supply to the line.

The portable test equipment may further include a potentiometer L in the meter circuit to control the sensitivity range of the meter, and a switch 17 may be used to shunt the meter for overload protection.

When an insulated line is to be tested, the tapper connections will pierce the insulation as the tapper is hung over the line, and may have downwardly projecting sharp points for this purpose, sufficiently long to pierce through the thickest of insulations used on any of the service lines to be tested.

The test equipment for use with the tapper LT or LT2 may be assembled in a portable case 30, which may be provided with a control panel on its front face to facilitate operation of the device. The case 30 may include a source of current supply such as diagrammatically shown in FIG. 8, and the meter circuit including a potentiometer L and shunt switch 17 for protecting the meter against overloads as already mentioned. The terminals X and W may be provided with connector posts 39 and 40 on the panel face of the case in which the meter M is mounted as well as the other control elements of the circuits, such as the potentiometer knob L, the shunt switch control 17, the voltage supply control switch 14 and the push button test switch 15, as illustrated in FIG. 9.

To illustrate one specific use for the device of this invention, it is found that the present parallel fault locater will locate wet spots in paper covered lead telephone cable. When the paper covered wire inside the cable becomes wet it is grounded to the lead sheath of the cable. It has been discovered that when battery is connected to the circuits in trouble in the cable and is grounded to the cable sheath the circuit will flow through the circuits in trouble in the wet place to the cable sheath and back to the battery along the sheath. The parallel method of locating trouble will indicate the presence of this returning current and the exact spot that is wet can be easily located, as the path of the current can be followed with the meter. This makes this invention very valuable for this purpose. This only works on paper covered wires in lead or metal sheath cable. It would only locate places where the wires are grounded to the sheath. Practically all cracks or perforations in cable get the papersoaked and ground the wires to the sheath. This is by far the major trouble in lead cable and often very difficult to locate. We find that a parallel connection to the lead sheath is easy to make with the line tapper just as if it was a big wire.

Although this invention has been described in considerable detail, such description is intended as being illustrative rather than limiting, since the invention may be variously embodied, and the scope of the invention is to be determined as claimed.

What is claimed is:

1. The method of locating a faulty ground, short or cross in a single long conductor of an electrical signal communication transmission line connected between a source of alternating current intelligence communication signals having a substantially uniform direct current resistance throughout its length, said method comprising supplying direct current to said conductor at a point remote from said fault while communication signals are being transmitted over said line, connecting a direct current shunt metering circuit for sensing the direct current across substantially equal local portions of said conductor at successively accessible stations spaced along said conductor toward said fault, until a change in the current flow is sensed, and selecting succeeding stations at closer intervals between the last spaced stations for repeating said sensing operations until the exact location of the fault is found.

2. The method of claim 1 in which the conductor is insulated and including the step of piercing the insulation on the conductor to effect the connection of the direct current shunt metering circuit to the conductor.

References Cited in the file of this patent

UNITED STATES PATENTS

| | | |
|---|---|---|
| 369,665 | Thompson | Sept. 6, 1887 |
| 1,007,741 | Simpson | Nov. 7, 1911 |
| 1,321,543 | Niswonger | Nov. 11, 1919 |
| 1,650,779 | Williams | Nov. 29, 1927 |
| 1,745,419 | Henneberger | Feb. 4, 1930 |
| 1,770,000 | Kuhlman | July 8, 1930 |
| 2,243,259 | Pierce | May 27, 1941 |
| 2,408,045 | Cottrell | Sept. 24, 1946 |
| 2,529,270 | Webster | Nov. 7, 1950 |
| 2,615,076 | Miller | Oct. 21, 1952 |
| 2,653,297 | Mohylowski | Sept. 22, 1953 |
| 2,907,949 | Rogers | Oct. 6, 1959 |

OTHER REFERENCES

"Methods of Locating Faults on Underground Cables," article in Electrical World, February 14, 1925, pages 355–356.

"Fault Localisation," article in Electrical Review, December 28, 1945, pages 947–949.